United States Patent
Stoicescu et al.

(10) Patent No.: US 11,828,233 B2
(45) Date of Patent: Nov. 28, 2023

(54) FUEL PUMP SYSTEMS

(71) Applicant: Hamilton Sundstrand Corporation, Charlotte, NC (US)

(72) Inventors: Adrian L Stoicescu, Roscoe, IL (US); Edward W. Goy, Crystal Lake, IL (US); Benjamin T. Harder, Sycamore, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/535,902

(22) Filed: Nov. 26, 2021

(65) Prior Publication Data

US 2023/0167772 A1 Jun. 1, 2023

(51) Int. Cl.
*F02C 7/236* (2006.01)
*F02C 7/232* (2006.01)
*F02C 9/26* (2006.01)
*F02C 9/30* (2006.01)
*F02C 9/32* (2006.01)

(52) U.S. Cl.
CPC .............. *F02C 7/236* (2013.01); *F02C 7/232* (2013.01); *F02C 9/263* (2013.01); *F02C 9/30* (2013.01); *F02C 9/32* (2013.01); F05D 2220/323 (2013.01); F05D 2270/3015 (2013.01)

(58) Field of Classification Search
CPC .. F02C 7/22; F02C 7/232; F02C 7/236; F02C 9/30; F02C 7/36; F02C 7/38; F02C 9/32
See application file for complete search history.

(56) References Cited

U.S. PATENT DOCUMENTS

| | | | |
|---|---|---|---|
| 2,704,516 A | 3/1955 | Mock | |
| 2,720,256 A | 10/1955 | Pearson | |
| 3,026,929 A * | 3/1962 | Burns | B64D 37/16 417/203 |
| 3,319,570 A | 5/1967 | Norris et al. | |
| 4,208,871 A * | 6/1980 | Riple, Jr. | F02C 9/30 417/252 |
| 4,441,156 A * | 4/1984 | Barbeau | F02P 15/003 701/100 |
| 4,697,238 A * | 9/1987 | Barbeau | F02C 9/30 701/100 |

(Continued)

OTHER PUBLICATIONS

Extended European Search Report, of the European Patent Office, dated May 8, 2023, in corresponding European Patent Application No. 22209487.2.

*Primary Examiner* — Alain Chau
(74) *Attorney, Agent, or Firm* — Locke Lord LLP; Daniel J. Fiorello; Gabrielle L. Gelozin

(57) ABSTRACT

A fuel pump system can include a motor and a pump connected to the motor. The pump can be configured to receive an inlet flow from an inlet line, to pressurize the inlet flow, and to output a pressurized flow to an output line for an engine. The system can include a bypass line disposed between the outlet line and the inlet line, and a bypass valve disposed on the bypass line and configured to allow pressurized flow to flow to the inlet line in an open state, and to prevent pressurized flow from flowing to the inlet line in a closed state. The bypass valve can be configured to allow pressurized flow to flow to the inlet line to circulate flow and to maintain a constant pressure on the output line.

8 Claims, 3 Drawing Sheets

(56) References Cited

U.S. PATENT DOCUMENTS

| | | | |
|---|---|---|---|
| 6,289,919 B1* | 9/2001 | Sledd | G05D 16/028 |
| | | | 137/115.03 |
| 7,210,460 B2 | 5/2007 | Douyama et al. | |
| 7,458,362 B2 | 12/2008 | Hazama et al. | |
| 8,205,597 B2* | 6/2012 | Brocard | F02C 7/22 |
| | | | 123/457 |
| 8,302,406 B2 | 11/2012 | Baker | |
| 8,991,152 B2 | 3/2015 | Heitz | |
| 9,133,772 B2* | 9/2015 | Heitz | F02C 9/263 |
| 9,353,688 B2 | 5/2016 | Futa et al. | |
| 10,890,117 B2 | 1/2021 | Chalaud et al. | |
| 11,136,923 B2* | 10/2021 | Aounali | F02C 9/28 |
| 2008/0308076 A1 | 12/2008 | Reynolds et al. | |
| 2009/0199823 A1* | 8/2009 | Mahoney | F02C 7/222 |
| | | | 123/497 |
| 2010/0263634 A1* | 10/2010 | Futa, Jr. | F02C 7/232 |
| | | | 123/511 |
| 2011/0139123 A1* | 6/2011 | Brocard | F02C 9/28 |
| | | | 123/495 |
| 2012/0167594 A1* | 7/2012 | Poisson | F02C 9/36 |
| | | | 60/803 |
| 2012/0219429 A1* | 8/2012 | Heitz | F02C 9/263 |
| | | | 417/44.1 |
| 2012/0324905 A1* | 12/2012 | Hagshenas | F02C 7/236 |
| | | | 60/778 |
| 2015/0285150 A1* | 10/2015 | Masuda | F02C 9/28 |
| | | | 60/734 |
| 2016/0146108 A1* | 5/2016 | Yates | F02C 7/236 |
| | | | 415/124.1 |
| 2017/0030347 A1* | 2/2017 | McBrien | F04B 9/123 |
| 2017/0306790 A1* | 10/2017 | Coretto | F01D 21/02 |
| 2018/0050812 A1* | 2/2018 | Ribarov | F02C 7/236 |
| 2018/0291919 A1* | 10/2018 | Stoicescu | F02C 7/22 |
| 2019/0376450 A1* | 12/2019 | Tomov | F02C 9/28 |
| 2020/0191064 A1* | 6/2020 | Aounali | F02C 9/28 |
| 2021/0010429 A1* | 1/2021 | Brady | F02C 9/32 |
| 2021/0164399 A1* | 6/2021 | Masuda | F04C 2/10 |
| 2021/0239054 A1 | 8/2021 | Reuter et al. | |

* cited by examiner

FUEL PUMP SYSTEMS

FIELD

This disclosure relates to fuel pump systems (e.g., for aircraft).

BACKGROUND

Main frame pumps can be used to move the fuel from aircraft tanks to the engines, to move fuel from tank to tank, and to jettison the fuel in case of need, for example. Typically, main frame mounted fuel pumps are electric motor driven at fixed speed. By their nature these pumps are of the inducer (e.g., screw) type. They are sized to deliver the required flow and pressure at the takeoff condition. At cruise and idle the required pressure from the engine is reduced. With the reduced flow at cruise and idle, the pressure required to push the fuel to the engine is always lower. However, inducer pumps produce more pressure rise and take more power to drive at lower flows. Since, the majority of time, aircraft engines operate at idle and cruise, the fuel pumps draw too much power. Also, the motor has to be size for the maximum power it must output.

Such conventional methods and systems have generally been considered satisfactory for their intended purpose. However, there is still a need in the art for improved fuel pump systems. The present disclosure provides a solution for this need.

SUMMARY

A fuel pump system can include a motor and a pump connected to the motor. The pump can be configured to receive an inlet flow from an inlet line, to pressurize the inlet flow, and to output a pressurized flow to an output line for an engine. The system can include a bypass line disposed between the outlet line and the inlet line, and a bypass valve disposed on the bypass line and configured to allow pressurized flow to flow to the inlet line in an open state, and to prevent pressurized flow from flowing to the inlet line in a closed state. The bypass valve can be configured to allow pressurized flow to flow to the inlet line to circulate flow. The bypass valve can be configured to maintain a constant pressure on the output line.

The constant pressure can be above a maximum required pressure in a maximum flow condition. The motor can be a constant speed motor configured to turn the pump at a constant speed at a constant horsepower.

The system can include a control module configured to operate the motor at a constant speed to turn the pump at a constant speed to produce the constant pressure. The bypass valve can be a pressure regulating valve (PRV), for example. The PRV can be configured to open as a function of pressure differential between the output line and the input line.

In certain embodiments, the PRV can be mechanical and driven by the pressure differential between the output line and the input line. Any suitable valve or control scheme thereof is contemplated herein.

In certain embodiments, the pump can be an inducer pump comprising an axial impeller. Any other suitable pump type, e.g., that generates a higher pressure at lower engine speeds when operated at a constant speed, is contemplated herein.

In accordance with at least one aspect of this disclosure, an aircraft can include an engine, and a fuel pump system having an output line connected to the engine. The fuel pump system can include any suitable fuel pump system disclosed herein, e.g., described above.

In accordance with at least one aspect of this disclosure, a method can include driving an inducer pump to pump fuel on an output line connected to an aircraft engine, wherein driving is done at a constant speed, and bypassing flow from the output line to the input line to maintain a constant pressure on the output line. In certain embodiments, the constant pressure can be at or above a takeoff flow pressure required by the engine at a takeoff power setting.

In certain embodiments, bypassing flow can include using a mechanical pressure regulating valve which opens as a function of pressure on the output line relative to an input line. In certain embodiments, driving the inducer pump can include using a motor that is too small to supply sufficient pressure at idle or low speed engine conditions without bypassing flow from the output line to the input line. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
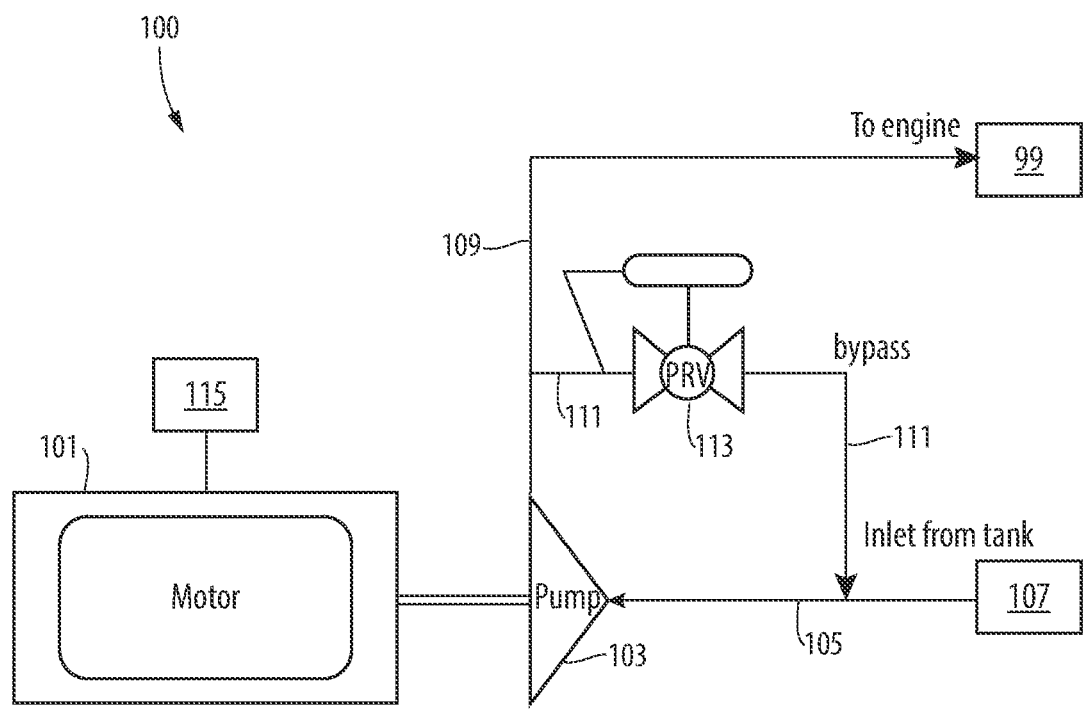
FIG. 1 is a schematic diagram of an embodiment of a fuel pump system in accordance with this disclosure.
Figure 2A:
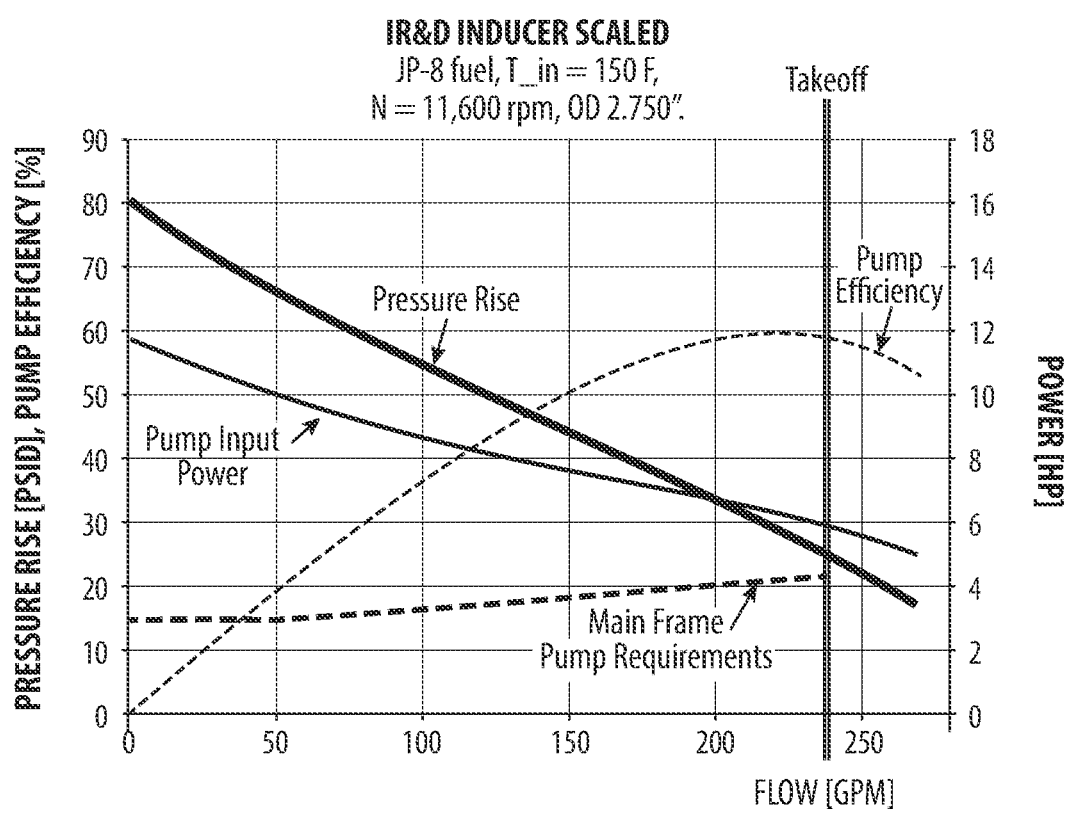
FIG. 2A shows a chart of pump pressure rise and motor input power as a function of flow rate, and plotted with pump efficiency and required pressure rise for a given flow from an embodiment of an engine, shown without bypassing flow.
Figure 2B:
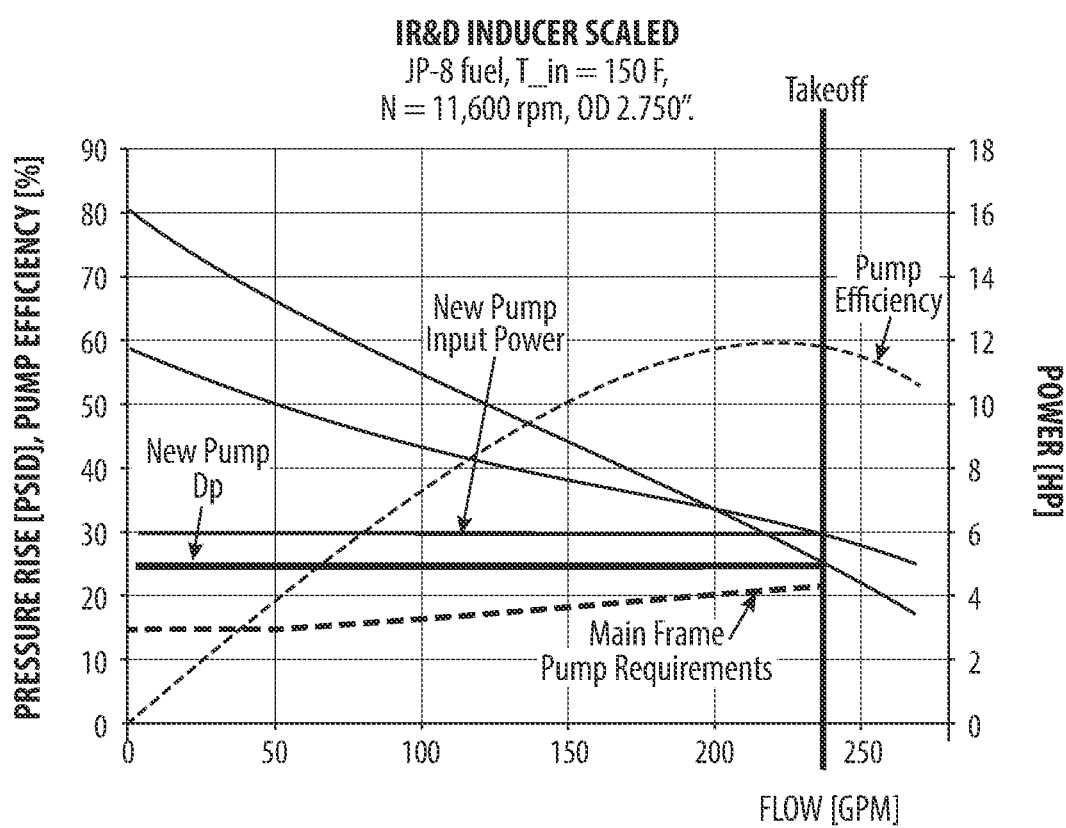
FIG. 2B shows a chart showing pump pressure rise and motor input power with flow bypassing, plotted on the same chart of FIG. 2A for comparison.

Reference will now be made to the drawings wherein like reference numerals identify similar structural features or aspects of the subject disclosure. For purposes of explanation and illustration, and not limitation, an illustrative view of an embodiment of a fuel pump system in accordance with the disclosure is shown in FIG. 1 and is designated generally by reference character 100. Other embodiments and/or aspects of this disclosure are shown in FIGS. 2A and 2B. Certain embodiments described herein can be used to reduce weight of fuel pump systems (e.g., in aircraft) as well as reducing unnecessary maximum line pressure. Any other suitable uses are contemplated herein.

Referring to FIG. 1, a fuel pump system 100 can include a motor 101 and a pump 103 connected to the motor 101. The pump 103 can be configured to receive an inlet flow from an inlet line 105 (e.g., connected to a tank 107), to pressurize the inlet flow, and to output a pressurized flow to an output line 109 for an engine 99 (e.g., a turbomachine). The system 100 can include a bypass line 111 disposed between the outlet line 109 and the inlet line 105. The system 100 can include a bypass valve 113 disposed on the bypass line 111 and configured to allow pressurized flow to flow to the inlet line 105 in an open state, and to prevent pressurized flow from flowing to the inlet line 105 in a closed state. The bypass valve 113 can be configured to allow pressurized flow to flow to the inlet line 105 to circulate flow. The bypass valve 113 can be configured to maintain a constant pressure on the output line 109.

The constant pressure can be above a maximum required pressure in a maximum flow condition (e.g., a takeoff flow condition for an aircraft engine). The motor 101 can be a constant speed motor configured to turn the pump 103 at a constant speed and at a constant horsepower.

In certain embodiments, the system 100 can include a control module 115 configured to operate the motor 103 at a constant speed to turn the pump 103 at a constant speed to produce the constant pressure. The control module 115 can include any suitable hardware and/or software module(s) configured to perform the disclosed function.

The bypass valve 113 can be a pressure regulating valve (PRV), for example. The PRV can be configured to open as a function of pressure differential between the output line 109 and the input line 105. In certain embodiments, the PRV can be mechanical and driven by the pressure differential between the output line and the input line. For example, when pressure is higher (e.g., above a threshold) on the output line 109 relative to the input line 105, the bypass valve 113 can begin to open, and can continuously open with more relative pressure. The amount of flow area through the valve 113 can be defined by the pressure differential, causing the pressure on the outlet line 109 to track a constant pressure. Any suitable valve or control scheme thereof is contemplated herein.

In certain embodiments, the pump 103 can be an inducer pump comprising an axial impeller (e.g., a screw as appreciated by those having ordinary skill in the art in view of this disclosure). Any other suitable pump type, e.g., that generates a higher pressure at lower engine speeds when operated at a constant speed, is contemplated herein.

As shown in FIG. 2A, a pump system without bypassing flow using a constant speed inducer pump generates the largest pressure (e.g., up to about 80 psi) at lower fuel flow conditions (e.g., idle and cruise) which required flow lines and connections to be robust enough to withstand such high pressures. As can be seen, the horsepower required at the lowest flow is about twice that at the takeoff flow condition (e.g., 6 horsepower in the shown embodiment), which requires a motor sized to produce up to at least the highest horsepower shown. However, referring to FIG. 2B, using the same pump but with the bypass of system 100, the pump pressure and the input horsepower can stay constant across all flow regimes. The motor can be sized to be about half of the size and weight of the motor needed to drive a system of without bypass (e.g., as shown in FIG. 2A), and the flow lines and connections can be smaller and lighter as they need not withstand as much pressure (e.g., about a third of previous maximum pressure).

In accordance with at least one aspect of this disclosure, an aircraft (not shown) can include an engine 99, and a fuel pump system, e.g., system 100, having an output line connected to the engine 99. The fuel pump system can be or include any suitable fuel pump system disclosed herein, e.g., system 100 described above.

In accordance with at least one aspect of this disclosure, a method can include driving an inducer pump to pump fuel on an output line connected to an aircraft engine, wherein driving is done at a constant speed, and bypassing flow from the output line to the input line to maintain a constant pressure on the output line. In certain embodiments, the constant pressure can be at or above a takeoff flow pressure required by the engine at a takeoff power setting.

In certain embodiments, bypassing flow can include using a mechanical pressure regulating valve which opens as a function of pressure on the output line relative to an input line. In certain embodiments, driving the inducer pump can include using a motor that is too small to supply sufficient pressure at idle or low speed engine conditions without bypassing flow from the output line to the input line. The method can include any other suitable method(s) and/or portion(s) thereof.

Embodiments can utilize a bypass valve to maintain pressure on the output line at or about a required takeoff pressure. The bypass valve can compare pressure from the output line to that of the input line. As pressure increases on the pump outlet side, the valve can open more to recycle more flow to the pump and the pressure on the output line can remain at a constant pressure to the engine.

Embodiments can provide and electric motor driven main frame pump with a bypass line. A bypass pressure regulating valve can be added to the pump line and set to maintain the pump discharge pressure to the desired pressure rise, e.g., for takeoff pressure. In embodiments, the pump power draw can always be that from the takeoff flow. Embodiments can reduce the power draw at cruise and idle condition to about half, and the motor sizing power can also be reduced by half.

Traditional main frame pumps are sized for the takeoff condition. Inducer pumps take more power and make more pressure rise at lower flows when not needed. Also, traditional motor is sized for the maximum pump power at idle flows. The main frame pumps can be required to operate with low inlet pressure and at times with two phase flow. That, combined with the desire to run at higher speeds for weight reduction, can lead to the main frame pumps being of the inducer type. Inducer pumps used as main frame pumps deliver more pressure and take more power at partial flows. That makes the motor size and power draw larger than needed at these conditions. Certain embodiments can add a bypass line around the pump along with back pressure regulating valve to always maintain the pump discharge pressure at that required at takeoff.

At partial flows, such as cruise and idle, the pump can produce more pressure rise based on its natural characteristic. In certain embodiments, a PRV can bypass the flow difference between takeoff and idle, or cruise and maintain the discharge pressure at a fixed value. The consequence of that at the pump level is that the pump can always operate at the takeoff condition, which, by design, can be the most efficient condition. A motor driven pump with no such valve will draw about twice as much power at idle and cruise when compared to the same pump operated with a PRV bypass valve. Compared to other solutions, embodiments can saves a good amount of power, size, and weight for low cost.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel pump system, comprising:
   a motor;
   a pump connected to the motor and configured to receive an inlet flow from an inlet line, to pressurize the inlet flow, and to output a pressurized flow to an output line for an engine;
   a bypass line disposed between the outlet line and the inlet line;
   a bypass valve disposed on the bypass line and configured to allow pressurized flow to flow to the inlet line in an open state, and to prevent pressurized flow from flowing to the inlet line in a closed state, wherein the bypass valve is configured to allow pressurized flow to flow to the inlet line to circulate flow, wherein the bypass valve is configured to maintain a constant pressure on the output line, wherein the constant pressure is above a maximum required pressure in a maximum flow condition, wherein the motor is a constant speed motor configured to turn the pump at a constant speed at a constant horsepower; and
   a control module configured to operate the motor at a constant speed to turn the pump at a constant speed to produce the constant pressure,
   wherein the bypass valve is a pressure regulating valve (PRV), wherein the PRV is configured to open as a function of pressure differential between the output line and the inlet line.

2. The fuel pump system of claim 1, wherein the PRV is mechanical and driven by the pressure differential between the output line and the inlet line.

3. The fuel pump system of claim 2, wherein the pump is an inducer pump comprising an axial impeller.

4. An aircraft, comprising:
   an engine; and
   a fuel pump system, comprising:
      a motor;
      a pump connected to the motor and configured to receive an inlet flow from an inlet line, to pressurize the inlet flow, and to output a pressurized flow to an output line connected to the engine;
      a bypass line disposed between the outlet line and the inlet line;
      a bypass valve disposed on the bypass line and configured to allow pressurized flow to flow to the inlet line in an open state, and to prevent pressurized flow from flowing to the inlet line in a closed state, wherein the bypass valve is configured to allow pressurized flow to flow to the inlet line to circulate flow and to maintain a constant pressure on the output line, wherein the constant pressure is above a maximum required pressure in a maximum flow condition, wherein the motor is a constant speed motor configured to turn the pump at a constant speed at a constant horsepower; and
      a control module configured to operate the motor at a constant speed to turn the pump at a constant speed to produce the constant pressure,
   wherein the bypass valve is a pressure regulating valve (PRV), wherein the PRV is configured to open as a function of pressure differential between the output line and the inlet line.

5. The aircraft of claim 4, wherein the PRV is mechanical and driven by the pressure differential between the output line and the inlet line.

6. The aircraft of claim 5, wherein the pump is an inducer pump comprising an axial impeller.

7. A method, comprising:
   driving an inducer pump to pump fuel on an output line connected to an aircraft engine, wherein driving is done at a constant speed; and
   bypassing flow from the output line to an input line to maintain a constant pressure on the output line, wherein the constant pressure is above a maximum required pressure in a maximum flow condition, wherein a motor driving the inducer pump is a constant speed motor configured to turn the inducer pump at a constant speed at a constant horsepower; and
   controlling, with a control module, the motor at a constant speed to turn the inducer pump at a constant speed to produce the constant pressure,
   wherein bypassing flow includes using a mechanical pressure regulating valve which opens as a function of pressure on the output line relative to the input line, wherein driving the inducer pump includes using a motor that is too small to supply sufficient pressure at idle or low speed engine conditions without bypassing flow from the output line to the input line.

8. The method of claim 7, wherein the constant pressure is at or above a takeoff flow pressure required by the engine at a takeoff power setting.

* * * * *